United States Patent
Hellerstein et al.

(10) Patent No.: US 9,875,141 B2
(45) Date of Patent: Jan. 23, 2018

(54) MANAGING POOLS OF DYNAMIC RESOURCES

(75) Inventors: Joseph L. Hellerstein, Seattle, WA (US); Eric Lynn Eilebrecht, Woodinville, WA (US); Vance Morrison, Kirkland, WA (US); Paul Ringseth, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1618 days.

(21) Appl. No.: 12/243,859

(22) Filed: Oct. 1, 2008

(65) Prior Publication Data

US 2010/0083272 A1 Apr. 1, 2010

(51) Int. Cl.
*G06F 9/46* (2006.01)
*G06F 9/50* (2006.01)
*G05B 13/02* (2006.01)

(52) U.S. Cl.
CPC ........ *G06F 9/5061* (2013.01); *G05B 13/0235* (2013.01); *G06F 2209/5011* (2013.01)

(58) Field of Classification Search
CPC ........................................ G05B 13/00–13/048
See application file for complete search history.

(56) References Cited

U.S. PATENT DOCUMENTS

| | | | | |
|---|---|---|---|---|
| 4,319,320 A | * | 3/1982 | Sato | ........................ F01K 13/02 60/665 |
| 6,069,894 A | * | 5/2000 | Holender et al. | ............. 370/397 |
| 6,901,446 B2 | | 5/2005 | Chellis et al. | |
| 7,174,379 B2 | | 2/2007 | Agarwal et al. | |
| 7,346,401 B2 | | 3/2008 | Diao et al. | |
| 7,350,186 B2 | | 3/2008 | Coleman et al. | |
| 7,401,244 B2 | | 7/2008 | Hellerstein et al. | |
| 2004/0237064 A1 | * | 11/2004 | Liu | .......................... G06F 9/50 717/101 |
| 2005/0005018 A1 | | 1/2005 | Datta | |
| 2005/0198641 A1 | | 9/2005 | Eilam et al. | |
| 2006/0159014 A1 | | 7/2006 | Breiter et al. | |

(Continued)

OTHER PUBLICATIONS

Adaptive Self-Configuration Architecture for J2EE-based Middleware Systems Yan Zhang, Wei Qu, and Anna Liu Proceedings of the 39th Hawaii International Conference on System Sciences Published: 2006.*

(Continued)

*Primary Examiner* — Emerson Puente
*Assistant Examiner* — Paul Mills
(74) *Attorney, Agent, or Firm* — Dicke, Billig & Czaja, PLLC

(57) ABSTRACT

Computer systems attempt to manage resource pools of a dynamic number of similar resources and work tasks in order to optimize system performance. Work requests are received into the resource pool having a dynamic number of resources instances. An instance-throughput curve is determined that relates a number of resource instances in the resource pool to throughput of the work requests. A slope of a point on the instance-throughput curve is estimated with stochastic gradient approximation. The number of resource instances for the resource pool is selected when the estimated slope of the instance-throughput curve is zero.

19 Claims, 3 Drawing Sheets

(56) References Cited

U.S. PATENT DOCUMENTS

2007/0299638 A1* 12/2007 Tantawi .................. 703/2
2010/0005468 A1* 1/2010 Chang ............... G06F 9/5083
                                                    718/102

OTHER PUBLICATIONS

A Hybrid Reinforcement Learning Approach to Autonomic Resource Allocation Gerald Tesauro, Nicholas K. Jongt, Rajarshi Das, and Mohamed N. Bennanit Published: 2006.*
A Comprehensive Toolset for Workload Characterization, Performance Modeling, and Online Control Li Zhang, Zhen Liu, Anton Riabov, Monty Schulman, Cathy Xia, and Fan Zhang Published: 2003.*
Exploiting Structure to Efficiently Solve Large Scale Partially Observable Markov Decision Processes Pascal Poupart pp. i-xii and 1-63 Published: 2005.*
Autonomic Provisioning of Backend Databases in Dynamic Content Web Servers Jin Chen, Gokul Soundararajan, Cristiana Amza IEEE International Conference on Autonomic Computing, 2006 (ICAC '06); pp. 231-242 Published: Jun. 2006.*
Optimizing Concurrency Levels in the .NET ThreadPool: A Case Study of Controller Design and Implementation Joseph L. Hellerstein, Vance Morrison, Eric Eilebrecht Published: 2008.*
Optimizing Quality of Service Using Fuzzy Control Yixin Diao, Joseph L. Hellerstein, and Sujay Parekh Published: 2002.*
Automated Provisioning of Back-end Databases in Shared Dynamic Content Server Clusters Gokul Soundararajan pp. i-v, and Chapters 1, 3, and 4 Published: 2005.*
Triage: Performance Isolation and Differentiation for Storage Systems Magnus Karlsson, Christos Karamanolis, Xiaoyun Zhu Published: 2004.*
An Approach to On-line Predictive Detection Fan Zhang Joseph L. Hellerstein Published: 2000.*
Online Data Migration for Autonomic Provisioning of Databases in Dynamic Content Web Servers Gokul Soundararajan and Cristiana Amza Published: 2005.*
An efficient method for on-line identification of steady state Songling Cao and R. Russell Rhinehart Published: 1995.*
Performance and Scalability Measurement of COTS EJB Technology Jenny Yan Liu Published: 2002.*
Response Time Vs Throughput Vs Threads Karthic Muthuvelu Published: Mar. 20, 2013.*
The JBoss 4 Application Server Guide—JBoss AS 4.0.2—Release 3 JBoss inc. Sections: 2.7.2.2 and 7.3 Published: 2005.*
JBoss Performance Tuning Part 2 Mastertheboss.com Published: Dec. 12, 2008.*
JBoss Datasource configuration Mastertheboss.com Published: Oct. 31, 2008.*
Software Architecture Design of an Autonomic System Yan Zhang, Anna Liu, Wei Qu Published: 2004.*
Automatically Tuning Database Server Multiprogramming Level Mohammed Abouzour Chapter 1-3 Published: 2007.*
Performance Control of Internet-based Engineering Applications Paolo Vercesi Chapter 5 Mar. 18, 2008.*
Applying Control Theory in the Real World: Experience With Building a Controller for the .NET Thread Pool Joseph L. Hellerstein, Vance Morrison, Eric Eilebrecht Published: 2010.*
Configuring Resource Managers Using Model Fuzzing: A Case Study of the .NET Thread Pool Joseph L. Hellerstein Published: 2009.*
Choi, Seungryul, "Hill-Climbing SMT Processor Resource Distribution", Retrieved at <<http://www.lib.umd.edu/drum/bitstream/1903/3514/1/umi-umd-3344.pdf>>, 2006, pp. 134.
Eilam, et al., "Using a Utility Computing Framework to Develop Utility Systems", Retrieved at <<http://www.entrepreneur.com/tradejournals/article/114367553_3.html>>, IBM Systems Journal, Mar. 2004, pp. 3.
Pazel, et al., "Neptune: A Dynamic Resource Allocation and Planning System for a Cluster Computing Utility", Retrieved at <<http://ieeexplore.ieee.org/xpl/freeabs_all.jsp?tp=&arnumber=1540441&isnumber=32898>>, Proceedings of the 2nd IEEE/ACM International Symposium on Cluster Computing and the Grid (CCGRID'02), pp. 8.
Judd, et al., "QoS-Based Resource Allocation in Dynamic Real-Time Systems", Retrieved at <<http://irg.cs.ohiou.edu/~jdeshpan/docs/dqram_acc2005.pdf>>, pp. 8.

* cited by examiner

MANAGING POOLS OF DYNAMIC RESOURCES

BACKGROUND

Resource pools can include a dynamic number of similar resources that are used to perform computing tasks or work requests. Each resource in the resource pool at a given time can be described as a resource instance, and the resource instances together make up the resource pool. Work requests enter the resource pool as a result of an application program interface call or other examples. When there are more work requests than resource instances available to do the requested work, as is often the case, the work requests are arranged in a work queue. As soon as a resource instance completes the work on a work request, the resource instance is made available for another work request in the queue. Examples of resource management systems include the .NET thread pool, server pools in the Tivoli Workload scheduler, and HP Global Workload Manager, and application instances in IBM WebSphere.

There are many examples of resource instances and work requests in computing. Such examples can include servers and applications. One particular example is the use of threads in a thread pool to process work requests in concurrent programs. Often, each thread can be assigned to a different processor or processing core. Also, multiple threads assigned to a single processor or processing core can be time multiplexed through the processor. A resource manager can be used to create threads when the amount of work is too high, or it can be used to destroy or make idle threads when the amount of work is too low.

There have been attempts to address the issue of finding the proper amount of resource instances to perform a given set of tasks. One early model was to develop techniques that keep all of the processors fully realized. In most cases, however, the designer will not know what resources will create a bottleneck in throughput and will not be able to compensate for it. System designers also use algorithms to determine whether resource instances, such as threads, can be created, made idle, or destroyed to optimize performance. Such algorithms are typically primarily focused on the amount of resource instances made available to perform the work requests in a queue.

In a typical model, however, the rate of work completion is related to both the nature of the work itself and the amount of resource instances available, both of which can be unknown beforehand and constantly change. Although many systems incorporate resource pools with resource instances that are managed dynamically, there remains a need to improve management in many of these systems.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

One embodiment provides a method of managing a resource pool of dynamic resource instances. Work requests are received into the resource pool having a dynamic number of resources instances. An instance-throughput curve is determined that relates a number of resource instances in the resource pool to throughput of the work requests. A slope of a point on the instance-throughput curve is estimated with stochastic gradient approximation. The number of resource instances for the resource pool is selected when the estimated slope of the instance-throughput curve is zero.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated, as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims. It is also to be understood that features of the various exemplary embodiments described herein may be combined with each other, unless specifically noted otherwise.

Figure 1:
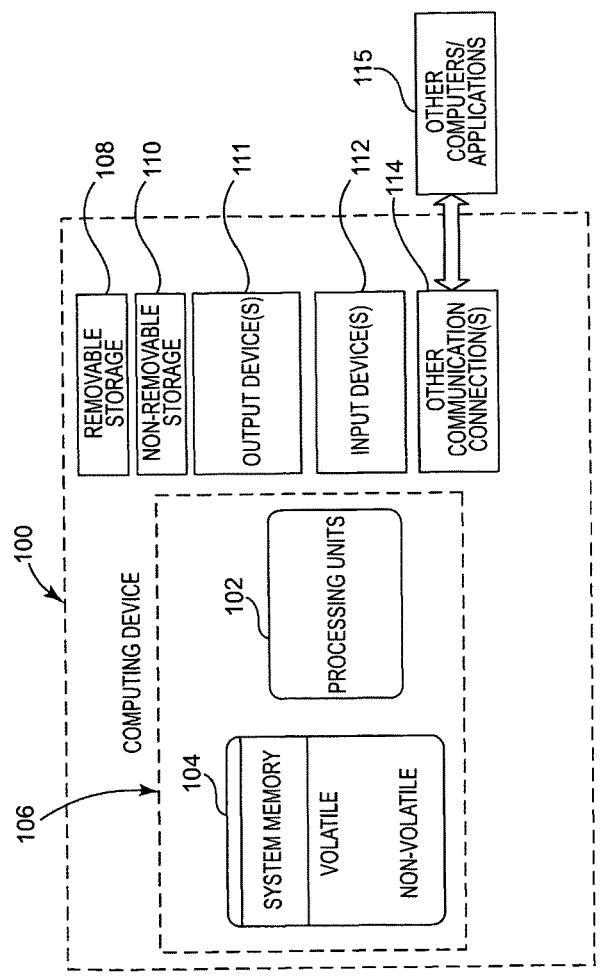
FIG. 1 is a block diagram illustrating one of many possible examples of computing devices implementing the features of the present disclosure.

FIG. 1 illustrates an exemplary computer system that can be employed as an operating environment includes a computing device, such as computing device 100. In a basic configuration, computing device 100 typically includes a processor architecture having at least two processing units (i.e., processors 102) and memory 104. Depending on the exact configuration and type of computing device, memory 104 may be volatile (such as random access memory (RAM)), non-volatile (such as read only memory (ROM), flash memory, etc.), or some combination of the two. This basic configuration is illustrated in FIG. 1 by dashed line 106. The computing device can take one or more of several forms. Such forms include a personal computer, a server, a handheld device, a consumer electronic device (such as a video game console), or other.

Computing device 100 can also have additional features/ functionality. For example, computing device 100 may also include additional storage (removable and/or non-removable) including, but not limited to, magnetic or optical disks or solid state memory, or flash storage devices such as removable storage 108 and non-removable storage 110. Computer storage media includes volatile and nonvolatile, removable and non-removable media implemented in any suitable method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, universal serial bus (USB) flash drive, flash memory card, or other flash storage devices, or any other medium that can be used to store the desired information and that can be accessed by computing device 100. Any such computer storage media may be part of computing device 100.

Computing device 100 includes one or more communication connections 114 that allow computing device 100 to communicate with other computers/applications 115. Computing device 100 may also include input device(s) 112, such as keyboard, pointing device (e.g., mouse), pen, voice input device, touch input device, etc. Computing device 100 may also include output device(s) 111, such as a display, speakers, printer, etc.

The computing device 100 can be configured to run an operating system software program and one or more software applications, which make up a system platform. In one example, the computing device 100 includes a software component referred to as a managed environment. The managed environment can be included as part of the operating system or can be included later as a software download. The managed environment typically includes pre-coded solutions to common programming problems to aid software developers to create software programs such as applications to run in the managed environment, and it also typically includes a virtual machine that allows the software applications to run in the managed environment so that the programmers need not consider the capabilities of the specific processors 102.

Figure 2:
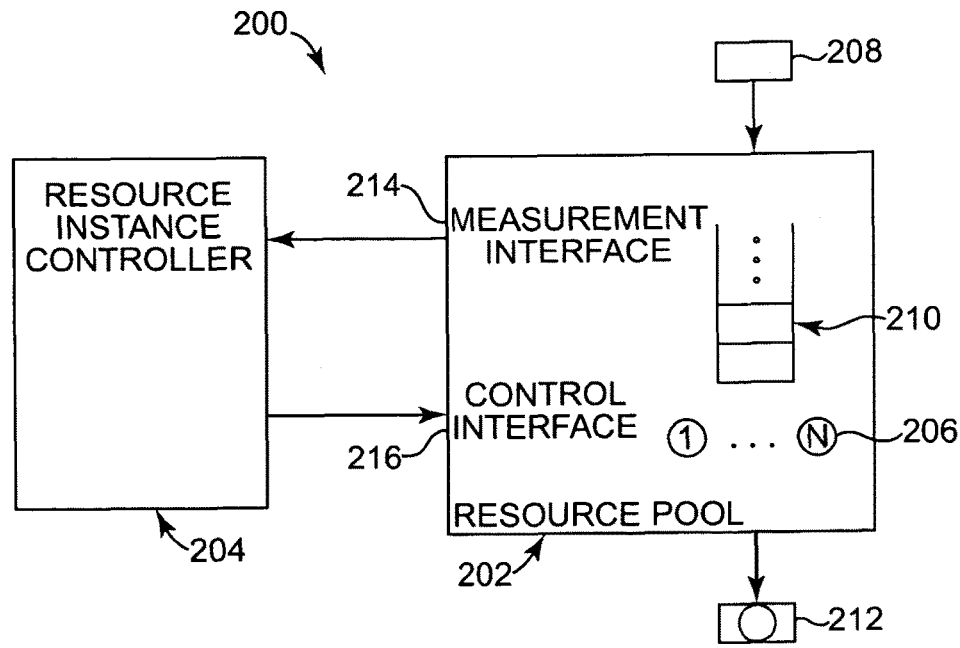
FIG. 2 is a block diagram illustrating an example resource management system in the example computing system of FIG. 1.

FIG. 2 illustrates an example resource management system 200 that can operate within the computing device 100. The system 200 includes a resource pool 202 operably coupled to a type of resource management, for example a resource instance controller 204. The resource pool 202 includes a dynamic number of resource instances 206, such as the illustrated resource instances 1 to N, where the number of resource instances N can continuously change in response to work requests 208. Work requests 208 enter the resource pool 202 as a result of an application program interface call (such as QueueUserWorkItem( ) in the NET ThreadPool, available from Microsoft Corp.), message receipt, or other means. The work requests 208 are placed in a work queue 210. A work request 208 waits in the work queue 210 until a resource instance 206 is available to execute the work request. Once the work request 208 is executed, a completed work 212 is passed from the resource pool 202.

The resource instance controller dynamically adjusts the number N of resource instances 206 based on two competing concerns. A first concern is that having too few resource instances 206 causes additional wait time for work requests 208. A second concern is that having too many resource instances 206 is inefficient because of overheads for each resource instance 206. Also, too many resource instances can reduce throughputs. For example, having too many threads can cause memory thrashing, excessive content switching, or both. In order for the resource instance controller 204 to dynamically adjust the number N of resource instances 206 in the example, the resource pool 202 provides measurement information to the resource interface controller 204 through a measurement interface 214. Such measurement information can include work queue counts, actual resource instances, and throughput, which can be defined as the number of work completions per unit of time in one example. The resource instance controller 204 dynamically adjusts the desired number of resource instances 206 (i.e., provides control settings) through a control interface 216 on the resource pool 202.

The resource instance controller 204 receives the measurement data and implements a process to dynamically adjust the desired number of resource instances. This process faces the problem of scheduling without a detailed knowledge of the resources involved. One extreme approach to solving this problem is to assume knowledge of the resources involved, which is difficult to implement because this information is difficult to obtain in practice. Another extreme is to perform extensive searching, such as recursive searching, to determine the knowledge of the resources involved. Despite this effort, there is no way to obtain this information in a reliable way.

One embodiment of resource instance controller 204 makes an assumption that there is a unimodal relationship between the number N of resources instances 206 and throughput, or the instance-throughput curve. A unimodal instance-throughput curve is broadly consistent with observed data for throughputs in virtual memory systems in general and in the NET thread pool in particular. The resource instance controller 204 can exploit the unimodal structure of the resource-instance curve to determine a new control setting that is provided to the resource pool 202.

Given the discovered nature of the instance-throughput curve, one example of the resource instance controller 204 uses stochastic gradient approximation to exploit the unimodal structure of the instance-throughput curve. The resource instance controller in this example employs stochastic gradient approximation to optimize the number of resource instances 206 in the resource pool 202. Stochastic gradient approximation optimizes a stochastic function such as the instance-throughput curve using deterministic techniques. With stochastic gradient approximation, the resource instance controller 204 uses the measurement information from the measurement interface 214 to estimate the slope of the instance-throughput curve at a point corresponding with number N of resource instances 206 in the resource pool 202. The resource instance controller 204 makes adjustments to the number N of resource instances and re-estimates the slope of the instance-through put curve until the slope is estimated to be zero. A zero slope indicates that the number N of resource instances 206 optimizes throughput.

The number of resource instances at the point on the instance-throughput curve where the slope is zero indicates resource optimization in an empirically-supported assumption that the curve is unimodal. One type of unimodal curve is concave. Stochastic gradient approximation is employed in one embodiment because throughput is largely stochastic rather than deterministic as resource instances are added or taken away.

The effectiveness of stochastic gradient approximation largely depends on accurately estimating the slope of the instance-throughput curve. Several problems with accurately estimating the slope have been determined to potentially arise in practice. A first known problem is that measurements can be stationary but have high variability due to variations in execution times, the number of work completions, and other factors. A second known problem is that the shape of the instance-throughput curve can change over time due to changes in workloads, resources, or both. A third known problem is that the resource instance controller 204 itself introduces variability in that it changes the number of resource instances to maximize throughput.

Figure 3:
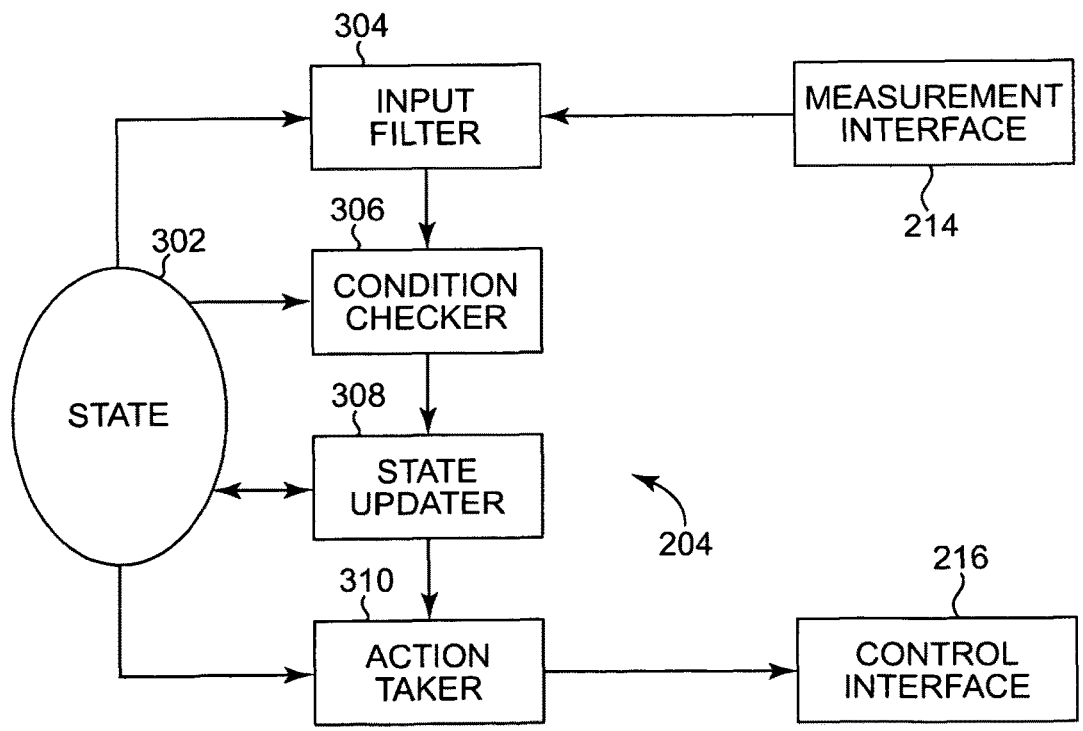
FIG. 3 is a block diagram illustrating an example resource instance controller of the resource management system of FIG. 2.

FIG. 3 illustrates an example resource instance controller 204 that can be employed to apply stochastic gradient approximation and address at least the above three problems that can arise in employing stochastic gradient approximation. The resource instance controller 204 includes a state 302, which is used to retain information to be used in invocations of the resource instance controller. The state 302 is coupled to several components such as an input filter 304, a condition checker 306, a state updater 308, and an action taker 310.

The input filter 304 is coupled to the measurement interface 214 of the resource pool 202, and receives the measurement information. The input filter 304 includes a mechanism to avoid using measurements when the resource pool is in transition. The input filter 304 compares the desired number of resource instances 206 specified in the last control action with the actual number of resources instances as measured the resource pool measurement interface 214. If the actual number of resource instances is less than the desired number of resource instances and the work queue 210 is not empty, then the measurement is discarded because the resource pool 202 is in transition to the desired number of resource instances. The measurement is also discarded if the desired number of resources is less than the actual amount of resources. Thus, the mechanism of the input filter 304 is used to address the problem of the resource instance controller 204 introduces variability in that it changes the number of resource instances to maximize throughput.

The input filter 304 can also include at least two additional mechanisms. One mechanism detects changes in the instance-throughput curve. The mechanism tests if a throughput measurement, such as work completions, measured at a time $t_{n+1}$ is significantly different from measurements at times $t_1 \ldots, t_n$ at the same control setting, such as desired resource instances. In one example, the mechanism uses the techniques of change-point detection, which is a statistical technique used in manufacturing, to detect changes in the instance-throughput curve. Another mechanism removes additional transients due to control actions. In practice, there may be a warm-up or cool-down period in the resource pool 202 even after it has instantiated the desired number of resource instances. Accordingly, more recent throughput measurements can differ significantly from earlier measurements for the same control setting. The input filter 304 can eliminate, or reduce the significance of, the earlier measurements. Thus, the additional two mechanisms in the input filter are used to address the problem of the shape of the instance-throughput curve can change over time due to changes in workloads, resources, or both.

The condition checker 306 is coupled the input filter 304. The condition checker implements a state machine to determine how the resource instance controller 204 adjusts the number of resource instances 206. In one example, the state machine includes an initializing state and a climbing state. In the initializing state, the resource instance controller 204 establishes one point for a first tangent line, which is tangent to the instance-throughput curve. In the climbing state, the resource instance controller 204 establishes a second point for a second tangent line on the instance-throughput curve. The states are determined by the number of control settings for which there are throughput measurements. For the initializing state, there is only one current control setting. For the climbing state, there is a current and previous control setting. If the resource instance controller 204 is in the climbing state and there is a significant difference between the current and previous control setting, then stochastic gradient approximation is employed to establish a new current control setting.

The condition checker 306 can be employed to address at least two of the know problems described above. The problem of measurements being stationary but having high variability due to variations in execution times, the number of work completions, and other factors is addressed because the resource instance controller 204 can remain in the initializing state until there is a sufficiently small variance for the mean throughputs at the current control setting. The resource instance controller does not attempt stochastic gradient approximation until there is a sufficiently small variance for the mean throughput at the current control setting. The condition checker 306 can also be used to address that the shape of the instance-throughput curve can change over time because the resource instance controller 204 can delete all history and return to the initializing state when it detects a change point.

The state updater 308 is coupled to the condition checker 306, and receives and provides information to the state 302. The state updater 308 includes a mechanism the updates information retained between invocations of the resource instance controller 204. This information includes measurement histories and control setting histories.

The action taker 310 is coupled to the state updater and provides an output to the control interface 216 of the resource pool 202. The action taker 310 is used to determine the new control setting. In one example, the new control setting is calculated using stochastic gradient approximation. The calculation estimates the slope of the instance-throughput curve that relates resource instances to throughputs based on the throughput measurements in the most recent history, or previous history, and the current throughput measurement, or the current history. Employing stochastic gradient approximation, a new control setting is calculated. The action taker 310 also assesses the performance achieved at a control setting. If comparable performance is achieved at two different control settings, then the resource interface controller 204 takes an action that minimizes the number of resource instances 206.

Figure 4:
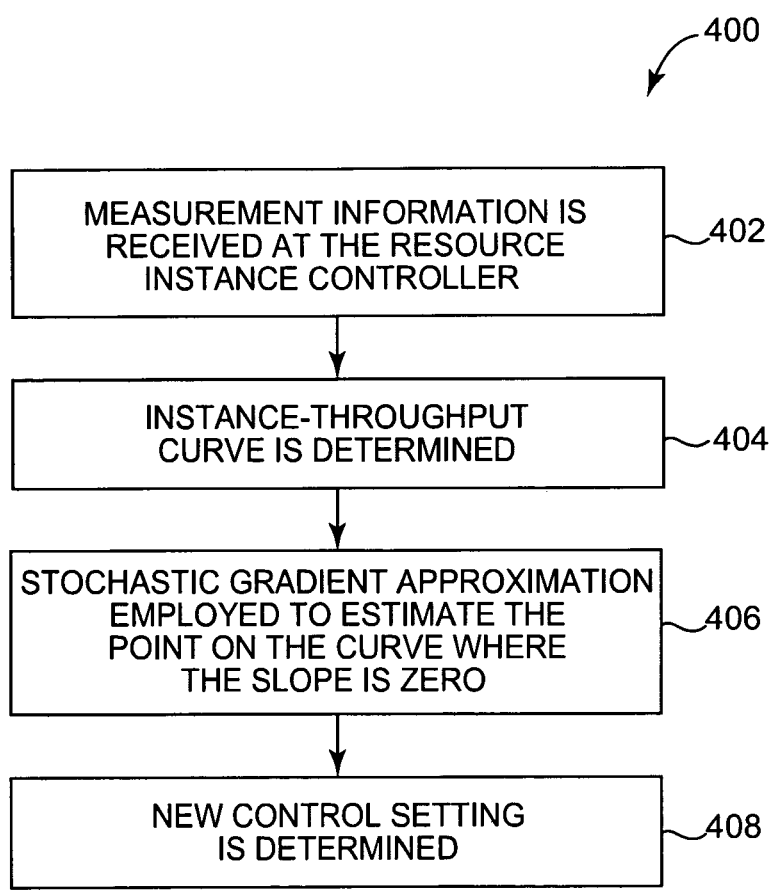
FIG. 4 is a flow diagram illustrating an example method for use with the resource management system of FIG. 2.

FIG. 4 illustrates an example method 400 of managing the resource pool 202 of resource instances 206, which method can be embodied in the resource instance controller 204 of FIG. 2. As work requests 208 are received into the resource pool 202, information regarding the resource pool is included in measurement information that is provided at 402 to the resource instance controller 204. In one example, the resource instance controller 204 is provided with periodic measurement information updates. The measurement information updates can be retained as a measurement history, which can include a sequence of updates of measurement information related to control settings. Examples of a measurement history can include measurement information related to a current control setting, a previous control setting, and so on.

Based on the measurement information, the resource instance controller 204 determines an instance-throughput curve at 404 relating the number of resource instances N in the resource pool 202 to throughput. In one example, the measurement history is used to determine the instance-throughput curve.

Stochastic gradient approximation is employed to estimate the slope of the curve, and is used to find the point where the slope is zero at 406. This point can be determined using the current control setting and the previous control setting. The point on the curve where the slope is zero corresponds with a selected number of resource instances estimated to maximize throughput. A new control setting is generated based on the selected number of resource instances at 408 and provided to the resource pool 202.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A method of managing a resource pool comprising a dynamic number of resource instances executing work requests from a work queue, the number of thread instances in the resource pool based on a control setting which specifies a desired number of resources to be in the pool, the method comprising:

retaining measurement information of the resource pool including a previous history of throughput measurements for a previous control setting and a current history of throughput measurements for a current control setting such that when a new control setting is established the current history becomes the previous history and the new control setting becomes the current control setting;

entering an initializing state, the initializing state comprising:

collecting throughput measurements of the thread pool operating at the current control setting until there is a plurality of throughput measurements in the current history and there is less than a selected threshold of variance for a mean throughput of the current history; and when there is less than the selected threshold of variance, establishing a first new control setting as the current control setting and exiting the initializing state; and in response to exiting the initializing state, entering a climbing state, the climbing state comprising:

collecting throughput measurements of the resource pool operating at the current control setting until there is a plurality of throughput measurements in the current history and there is less than the selected threshold of variance for the mean throughput of the current history;

when there is less than the selected threshold of variance, estimating, via stochastic gradient approximation, the slope of a point on an instance-throughput curve using the previous history, the previous control setting, the current history, and the current control setting, the instance-throughput curve relating the number of thread instances in the thread pool to throughput of the resource pool and the point corresponding to the desired number of resources specified in the current control setting;

when the estimated slope is zero, reentering the climbing state; and when the estimated slope is not zero, calculating a next new control setting using the estimated slope, establishing the calculated next new control setting as the current control setting, and reentering the climbing state;

the collecting throughput measurements in the initializing state and in the climbing state comprising receiving, from a measurement interface of the resource pool, a plurality of throughput measurements and for each received throughput measurement:

receiving, from the measurement interface, an actual number of resources representing the number of resource instances executing work requests in the resource pool when the received throughput measurement was taken;

comparing the desired number of resources specified in the current control setting to the actual number of resources;

discarding the received throughput measurement if either the desired number of resources is less than the actual number of resources or the desired number of threads is greater than the actual number of resources and the work queue is not empty;

adding the received throughput measurement to the current history if the received throughput measurement was not discarded;

determining, by applying a change-point detection technique to the throughput measurements in the current history, whether the shape of the instance-throughput curve has changed; and in response to determining the shape of the instance-throughput curve has changed, deleting the previous and current history and reentering the initializing state.

2. The method of claim 1 wherein control settings are established via a control interface of the resource pool.

3. The method of claim 1 wherein the measurement information further includes work queue counts.

4. The method of claim 1 wherein the dynamic number of resources in the resource pool are added and taken away as a result of creating resources and destroying resources.

5. The method of claim 1 wherein the point where the estimated slope of the instance-throughput curve is zero indicates the number of resource instances which optimizes throughput based on an assumption that the instance-throughput curve is unimodal.

6. The method of claim 1 further comprising taking an action that minimizes the number of threads in response to determining the throughput measurement in the previous history are substantially similar to the throughput measurements in the current history.

7. The method of claim 1 wherein the resource instances include thread instances.

8. A system for managing a thread pool comprising a dynamic number of thread instances to execute work requests from a work queue, the number of thread instances in the thread pool based on a control setting that specifies a desired number of threads to be in the pool, the system comprising:

a memory to store a set of executable instructions; and a processor configured to execute the set of instructions to cause the system to:

retain measurement information of the thread pool including a previous history of throughput measurements for a previous control setting and a current history of throughput measurements for a current control setting such that when a new control setting is established the current history becomes the previous history and the new control setting becomes the current control setting;

enter an initializing state, the initializing state comprising the system being caused to:
  collect throughput measurements of the thread pool operating at the current control setting until there is a plurality of throughput measurements in the current history and there is less than a selected threshold of variance for a mean throughput of the current history; and
  when there is less than the selected threshold of variance, establish a first new control setting as the current control setting and exit the initializing state; and in response to exiting the initializing state, enter a climbing state, the climbing state comprising the system being caused to:
  collect throughput measurements of the thread pool operating at the current control setting until there is a plurality of throughput measurements in the current history and there is less than the selected threshold of variance for the mean throughput of the current history;
  when there is less than the selected threshold of variance, estimate, via stochastic gradient approximation, the slope of a point on an instance-throughput curve using the previous history, the previous control setting, the current history, and the current control setting, the instance-throughput curve relating the number of thread instances in the thread pool to throughput of the thread pool and the point corresponding to the desired number of threads specified in the current control setting;
  when the estimated slope is zero, reenter the climbing state; and
  when the estimated slope is not zero, calculate a next new control setting using the estimated slope, establish the calculated next new control setting as the current control setting, and reenter the climbing state;

the system being caused to collect throughput measurements in the initializing state and in the climbing state comprising the system being caused to receive, from a measurement interface of the thread pool, a plurality of throughput measurements and for each received throughput measurement:
  receive, from the measurement interface, an actual number of threads representing the number of thread instances executing work requests in the thread pool when the received throughput measurement was taken;
  compare the desired number of threads specified in the current control setting to the actual number of threads;
  discard the received throughput measurement if either the desired number of threads is less than the actual number of threads or the desired number of threads is greater than the actual number of threads and the work queue is not empty;
  add the received throughput measurement to the current history if the received throughput measurement was not discarded;
  determine, by applying a change-point detection technique to the throughput measurements in the current history, whether the shape of the instance-throughput curve has changed; and in response to the shape of the instance-throughput curve having changed, delete the previous and current history and reenter the initializing state.

9. The system of claim 8 wherein control settings are established via a control interface of the thread pool.

10. The system of claim 8 wherein the measurement information further includes work queue counts.

11. The system of claim 8 wherein the dynamic number of threads in the thread pool are added and taken away as a result of creating threads and destroying threads.

12. The system of claim 8 wherein the point where the estimated slope of the instance-throughput curve is zero indicates the number of thread instances which optimizes throughput based on an assumption that the instance-throughput curve is unimodal.

13. The system of claim 8, further causing the system to:
  take an action that minimizes the number of threads in response to a determination that the throughput measurements in the previous history are substantially similar to the throughput measurements in the current history.

14. A computer-readable storage medium, which does not include a transitory propagating signal, to store computer-executable instructions to manage a thread pool comprising a dynamic number of thread instances to execute work requests from a work queue, the number of thread instances in the thread pool based on a control setting that specifies a desired number of threads to be in the pool, the instructions, when executed by a processor, cause the processor to:
  retain measurement information of the thread pool including a previous history of throughput measurements for a previous control setting and a current history of throughput measurements for a current control setting such that when a new control setting is established the current history becomes the previous history and the new control setting becomes the current control setting;
  enter an initializing state, the initializing state comprising the processor being caused to:
    collect throughput measurements of the thread pool operating at the current control setting until there is a plurality of throughput measurements in the current history and there is less than a selected threshold of variance for a mean throughput of the current history; and
    when there is less than the selected threshold of variance, establish a first new control setting as the current control setting and exit the initializing state; and
  in response to exiting the initializing state, enter a climbing state, the climbing state comprising the processor being caused to:
    collect throughput measurements of the thread pool operating at the current control setting until there is a plurality of throughput measurements in the current history and there is less than the selected threshold of variance for the mean throughput of the current history;
    when there is less than the selected threshold of variance, estimate, via stochastic gradient approximation, the slope of a point on an instance-throughput curve using the previous history, the previous control setting, the current history, and the current control setting, the instance-throughput curve relating the number of thread instances in the thread pool to throughput of the thread pool and the point corresponding to the desired number of threads specified in the current control setting;

when the estimated slope is zero, reenter the climbing state; and when the estimated slope is not zero, calculate a next new control setting using the estimated slope, establish the calculated next new control setting as the current control setting, and reenter the climbing state;

the processor being caused to collect throughput measurements in the initializing state and in the climbing state comprising the processor being caused to receive, from a measurement interface of the thread pool, a plurality of throughput measurements and for each received throughput measurement:

receive, from the measurement interface, an actual number of threads representing the number of thread instances executing work requests in the thread pool when the received throughput measurement was taken;

compare the desired number of threads specified in the current control setting to the actual number of threads;

discard the received throughput measurement if either the desired number of threads is less than the actual number of threads or the desired number of threads is greater than the actual number of threads and the work queue is not empty;

add the received throughput measurement to the current history if the received throughput measurement was not discarded;

determine, by applying a change-point detection technique to the throughput measurements in the current history, whether the shape of the instance-throughput curve has changed; and in response to the shape of the instance-throughput curve having changed, delete the previous and current history and reenter the initializing state.

15. The computer readable storage medium of claim 14 wherein control settings are established via a control interface of the thread pool.

16. The computer readable storage medium of claim 14 wherein the measurement information further includes work queue counts.

17. The computer readable storage medium of claim 14 wherein the dynamic number of threads in the thread pool are added and taken away as a result of creating threads and destroying threads.

18. The computer readable storage medium of claim 14 wherein the point where the estimated slope of the instance-throughput curve is zero indicates the number of thread instances which optimizes throughput based on an assumption that the instance-throughput curve is unimodal.

19. The computer readable storage medium of claim 14, further comprising take an action that minimizes the number of threads in response to a determination the throughput measurements in the previous history are substantially similar to the throughput measurements in the current history.

\* \* \* \* \*